Sept. 11, 1956
L. BODDY
2,762,997
GAUGING SYSTEM WITH ALARM MEANS
Filed Jan. 12, 1950
5 Sheets-Sheet 1
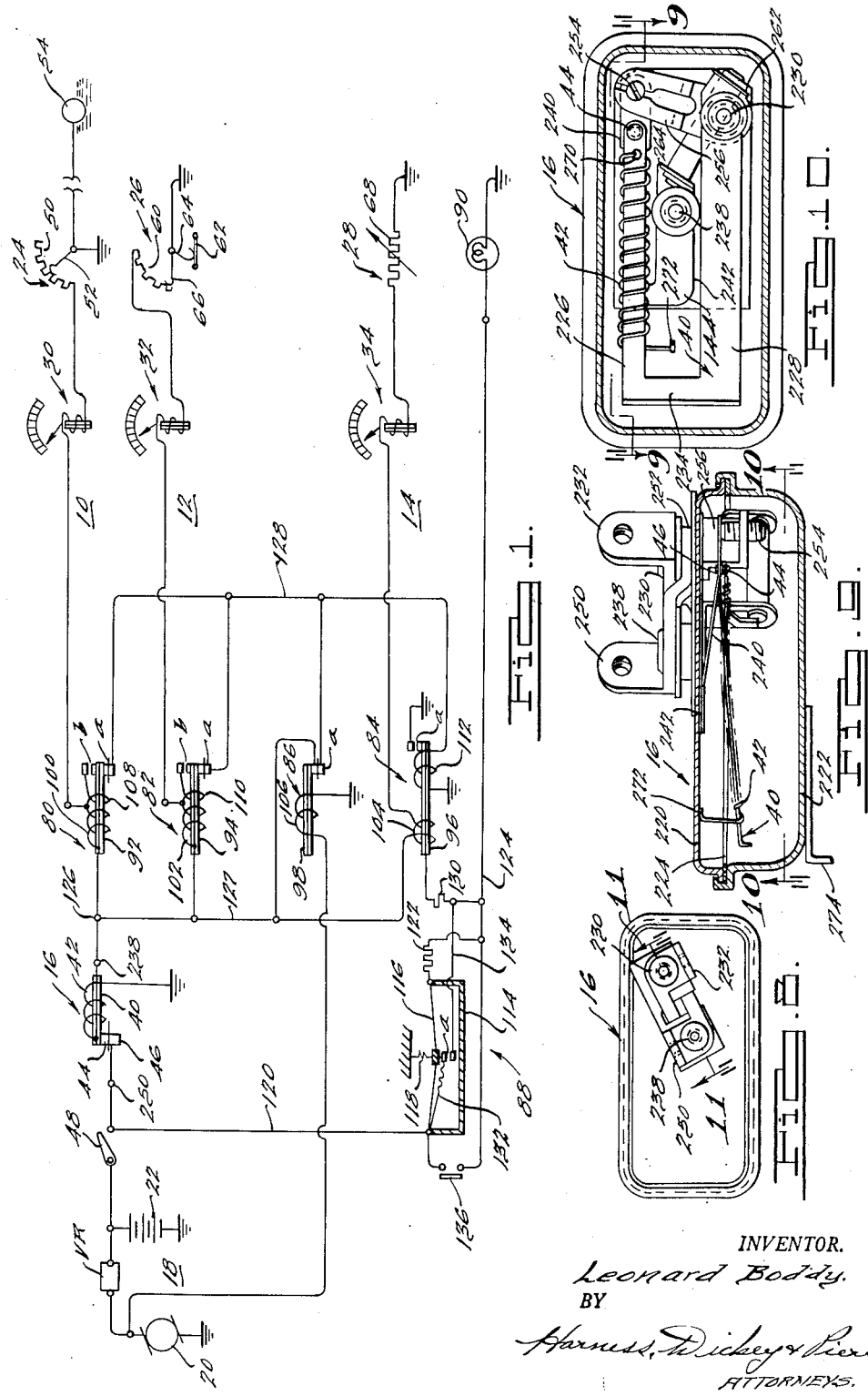
INVENTOR.
Leonard Boddy.
BY
Harness, Dickey & Pierce
ATTORNEYS.

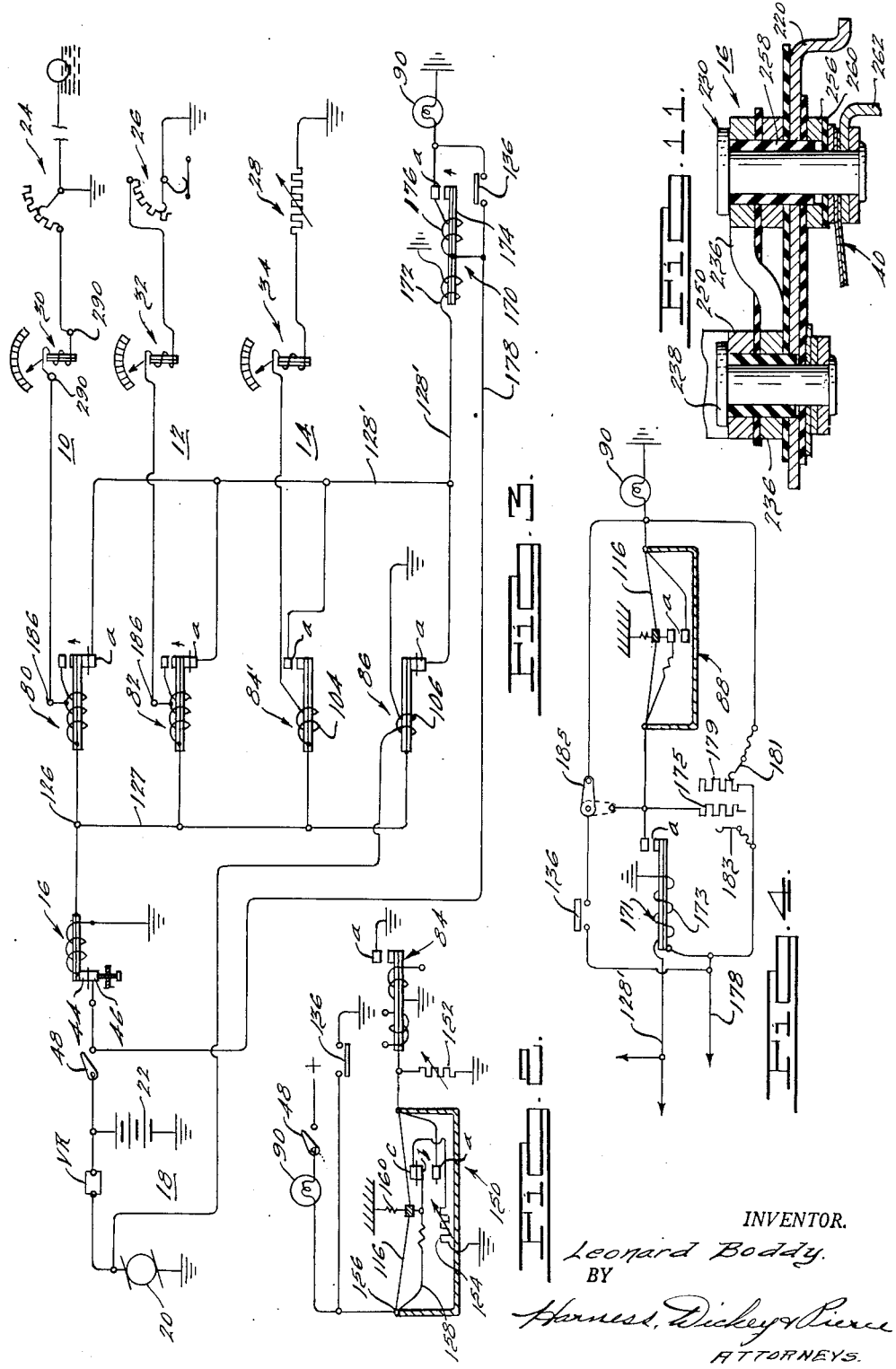

Sept. 11, 1956  L. BODDY  2,762,997
GAUGING SYSTEM WITH ALARM MEANS
Filed Jan. 12, 1950  5 Sheets-Sheet 3

INVENTOR.
Leonard Boddy.
BY
Harness, Dickey & Pierce
ATTORNEYS.

Sept. 11, 1956 L. BODDY 2,762,997
GAUGING SYSTEM WITH ALARM MEANS
Filed Jan. 12, 1950 5 Sheets-Sheet 4
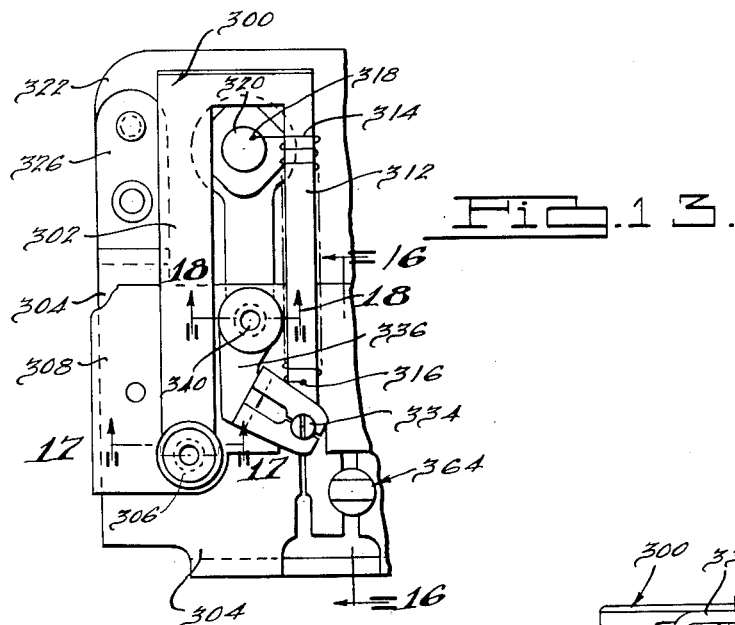
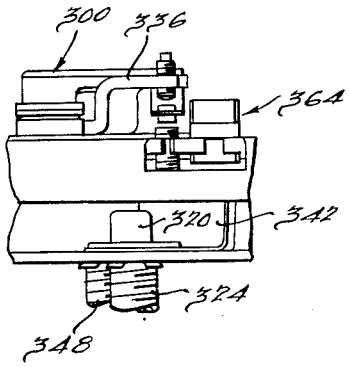
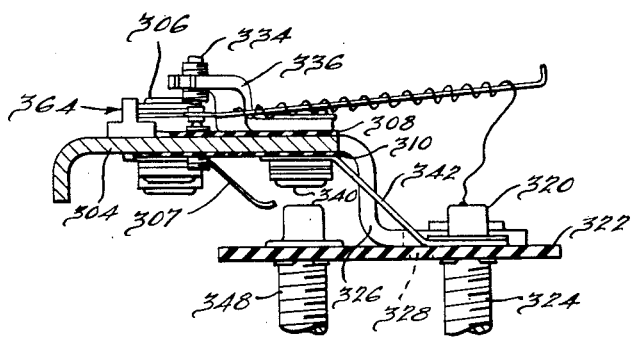
INVENTOR.
Leonard Boddy.
BY
ATTORNEYS.

Sept. 11, 1956 L. BODDY 2,762,997
GAUGING SYSTEM WITH ALARM MEANS
Filed Jan. 12, 1950 5 Sheets-Sheet 5
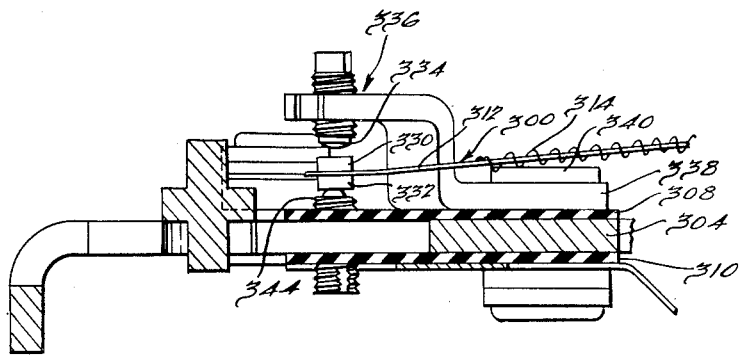
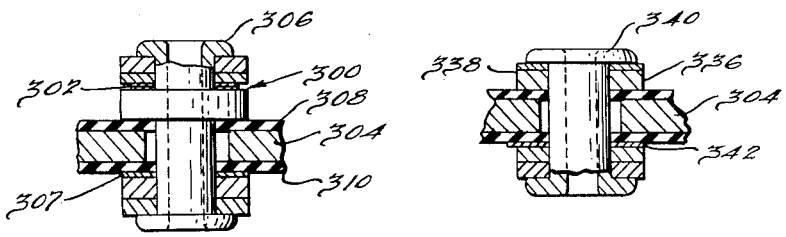
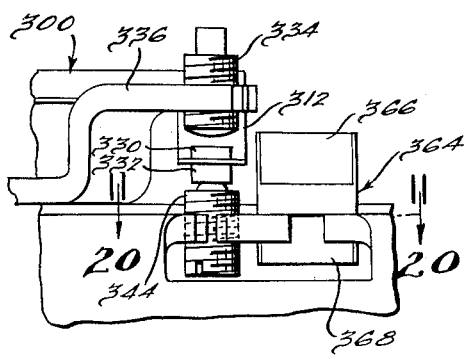
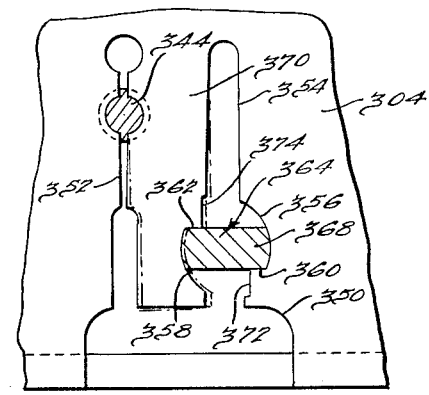
INVENTOR.
Leonard Boddy.
BY
Harness, Dickey & Pierce
ATTORNEYS.

United States Patent Office 2,762,997
Patented Sept. 11, 1956

2,762,997

GAUGING SYSTEM WITH ALARM MEANS

Leonard Boddy, Ann Arbor, Mich., assignor to King-Seeley Corporation, Ann Arbor, Mich., a corporation of Michigan Application January 12, 1950, Serial No. 138,249

30 Claims. (Cl. 340—213)

The present invention relates to electric gauging systems. In its illustrated embodiments, it is directed to automotive gauging systems of the regulated voltage type, embodying a plurality of indicators for indicating a plurality of operating conditions of the vehicle (such as fuel level, oil pressure, engine temperature, and the like) and is particularly characterized as further embodying improved signal mechanism which becomes operative in the event any one or more or all of the aforesaid or other operating conditions reaches a critical value.

The copending application of the present applicant, Serial No. 108,773, filed August 5, 1949, discloses and claims an electrical gauging system of the above indicated type, embodying a plurality of individual gauging circuits for indicating, respectively, fuel level, oil pressure, and engine temperature. Each circuit includes a rheostatic element which responds to the corresponding operating condition and serves to vary the resistance of the corresponding gauging circuit in accordance with changes in the corresponding operating condition. A voltage regulator common to the gauging circuits serves to render the voltage impressed thereacross independent of changes in the voltage of the vehicle battery or generator.

In further accordance with the disclosure of the copending application, some or all of the rheostatic elements are provided with auxiliary contact structure to complete a signal circuit when and if the corresponding operating condition reaches a critical value. For example, a signal is given in the event the fuel level reaches a critically low value.

The present invention constitutes an improvement over that of the copending application in various respects. For example, in accordance with the present invention, the signal mechanism may be supplied either as an accessory for addition to an existing gauging system, or as an original-equipment part thereof. Further, in accordance with the present invention, the addition of the signal mechanism does not involve the running of extra wires from the instrument panel back to the individual rheostatic elements, and, in applying the signal mechanism, no additional contact structure need be added to the rheostats.

In accordance with the illustrated embodiments of the present invention, a signal relay is interposed in each gauge circuit and is acted upon by the normal gauging currents flowing therein. When and if the corresponding gauging current reaches a critical limit, the signal relay responds and actuates a signal device which may be either visual, audible or otherwise. The signal device may be individual to a particular signal relay, but, as shown, a single signal device (of the flashing lamp type) is common to all the signal relays. The signal relays for the oil pressure and fuel level circuits, of course, respond in the event of low fuel level or oil pressure whereas the signal relay for the engine temperature circuit actuates the signal device only in the event the engine temperature reaches a critically high value. Provision is also made for actuating the signal device in response to other operating conditions, such as generator failure, unreleased hand brake, or the like.

With the foregoing as well as other considerations in view, which are disclosed below, principal objects of the present invention are to provide electric gauging systems, for measuring a plurality of different operating conditions, and embodying improved signal mechanism which responds in the event any one or more of the operating conditions reaches any one or more critical values; to provide such systems wherein the signal mechanism comprises a signal relay means individual to each of a plurality of gauging circuits, to provide such systems wherein the individual signal relays are arranged to actuate a signal device common thereto and to provide such systems wherein the impedance of each signal relay is automatically varied as a function of the current in the corresponding signal circuit, so as to insure that the portion of the regulated source voltage which is impressed across associated rheostat and indicator elements remains sufficiently uniform to satisfactorily meet commercial requirements.

Further objects of the present invention are to provide improved signal control mechanism particularly designed for, but not limited in its application to, automotive gauging systems, and which can readily be added to an existing gauging system as an accessory, or can form an original-equipment part thereof; to provide such signal control mechanism comprising a signal relay individual to each of a plurality of gauging circuits, and further comprising signal mechanism common to such signal relays; to provide such mechanism wherein the individual signal relays act automatically to vary the percentage of the source voltage which is absorbed thereby, so as to insure that a desired portion of the source voltage is available for proper operation of the other elements of the corresponding signal circuits; and to provide such signal control mechanism wherein the individual signal relays are of the thermally responsive type.

With the above as well as other and in certain cases more detailed objects in view, preferred but illustrative embodiments of the invention are shown in the accompanying drawings, throughout the several views of which corresponding reference characters are used to designate corresponding parts and in which:

Figure 1 is a diagrammatic view of a gauging system embodying the invention;

Fig. 2 is a fragmentary diagrammatic view, illustrating a modification of the system of Figure 1;

Fig. 3 is a diagrammatic view of a gauging system embodying a further modification of the invention;

Fig. 4 is a fragmentary diagrammatic view of a modification of the system of Fig. 3;

Fig. 8 is a plan view of a preferred construction of voltage regulator;

Fig. 9 is a view in vertical section, of the regulator of Fig. 8, and taken along the line 9—9 of Fig. 10;

Fig. 10 is a view in bottom plan, taken along the line 10—10 of Fig. 9;

Fig. 11 is a fragmentary view in vertical section, taken along the line 11—11 of Fig. 8;

Fig. 13 is a fragmentary view in plan, with the cover removed, showing a presently preferred construction of signal control relay;

Fig. 14 is a fragmentary view in front elevation of the structure of Fig. 13;

Fig. 15 is a view in end elevation of the structure of Figs. 13 and 14;

Fig. 16 is a view in vertical section taken along the line 16—16 of Fig. 13;

Fig. 17 is a fragmentary view in vertical section, taken along the line 17—17 of Fig. 13;

Fig. 18 is a fragmentary view in vertical section, taken along the line 18—18 of Fig. 13; and Figs. 19 and 20 are fragmentary enlarged views in front elevation and in plan view, respectively, of portions of the structure of Fig. 13.

Figure 5:
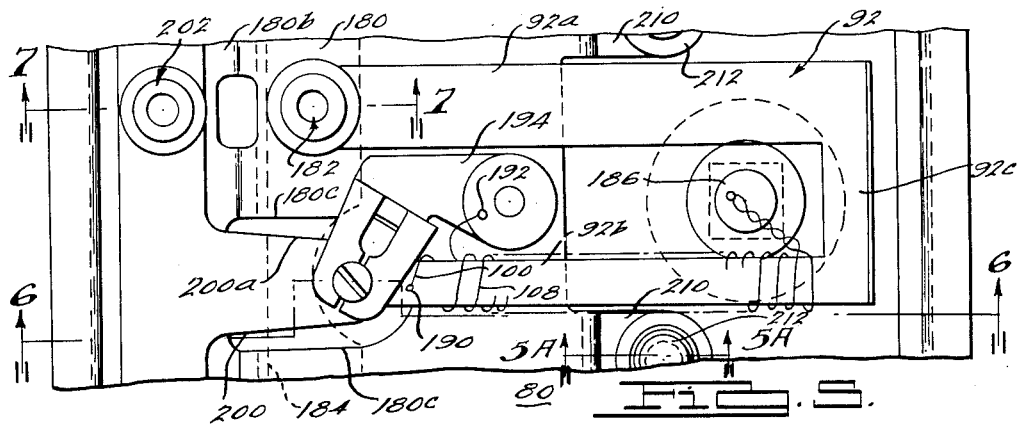
Fig. 5 is a fragmentary view in plan, with the cover removed, of a portion of a unitary signal control mechanism embodying the invention.

It will be appreciated from a complete understanding of the present invention that the improvements thereof can, in a generic sense, be embodied in electrical systems of widely differing types, for association with widely differing types of load circuits and widely differing types of energy supply sources. The illustrated embodiments of the present invention have been specifically designed for use as an accessory addition to, or as an original-equipment part of, automotive gauging systems, of the regulated voltage type, as disclosed in the aforesaid copending application, Serial No. 108,773. Such specific disclosure herein is, of course, to be regarded in an illustrative and not in a limiting sense.

Considering first the system of Figure 1, the illustrative gauging circuits 10, 12 and 14, are connected in parallel with each other and receive electric energy, at a voltage regulated by regulator 16, from a source 18. The source 18 may be of various types, but when, as aforesaid, the present improvements are used in connection with automotive vehicles, source 18 may, for example, comprise a usual engine driven generator 20 and a battery 22. In line with conventional automotive practice, a voltage regulator VR is interposed between the generator and the battery and, as will be understood, serves to maintain the voltage of the latter between limits which are acceptable for many of the vehicle requirements. In practice, these limits are not close enough for satisfactory operation of desirably simple electric gauges.

The regulator 16 receives the noticeably variable output of the source 18 and delivers pulsating energy to the gauging circuits, the effective voltage of the regulator being substantially independent of variations in the voltage of the source. Under these conditions, it will be appreciated that the individual gauging circuits can utilize simple rheostatic type units 24, 26, and 28 which, in response to liquid level, oil pressure and engine temperature serve to vary the resistance of the individual gauge circuits and thereby control the current therethrough, and consequently the positions of, the individual indicators 30, 32 and 34.

As diagrammatically shown in Figure 1, the regulator 16 may comprise a thermally responsive trimetallic element 40, which carries a heater winding 42. The trimetallic form is preferred since it makes it readily possible to provide good warpage characteristics, and still have, as an intermediate layer, a member which is a good conductor.

One terminal of winding 42 is grounded as indicated and the other terminal thereof is electrically connected to the element 40. Element 40 carries a movable contact 44, which normally engages an adjustably fixed contact 46. Contact 46 in turn is connected to the source 18 through a control switch 48 which may, for example, be controlled concurrently with or be a part of the ignition switch of the associated vehicle.

With this relation, it will be appreciated that closure of switch 48 completes the circuit from the source 18, through contacts 46—44, the body of the element 40 and the heater winding 42 to ground. Completion of this circuit supplies heat to the element 40 and causes its temperature to rise. The electrical resistance of the element 40 is so low that for all practical purposes, all of the heating effect can be considered as being derived from the winding 42. With this relation, element 40 can also serve as a conductor of the gauging currents.

Upon being heated, the element 40 warps and separates the contacts 44 and 46, interrupting the just traced circuit and interrupting the heating effect. The reduction in heating effect enables the element 40 to cool and restore the contacts 44—46 to closed condition. So long, accordingly, as switch 48 remains closed, contacts 44—46 are periodically opened and closed and the heating current is correspondingly modulated. Consequently, the element 40 acquires a temperature just high enough to hold the contacts 44—46 in a condition of incipient closing and opening. The critical temperature can be variously determined, as an incident to manufacture, by adjusting the position of the fixed contact 46 relative to the contact 44, so as to correspondingly determine the initial pressure between these terminals. For automotive work, it is usually preferred to adjust the regulator 16 to provide a regulated or effective voltage of about 5 volts or 5.4 volts, depending upon the absence or presence of the hereinafter described signal mechanism. Consequently, as aforesaid, and neglecting ambient effects, regulator 16 acts to receive from the source 18 an amount of electric energy, in pulsating form, which has a substantially uniform heating value. On this basis, and since, over any period of time, the wattage input to the regulator heater ($E^2/r$) is at a substantially constant rate, it is evident that the regulator 16 breaks up the energy supplied by source 18 into a succession of pulses having an effective voltage which is independent of variations in the voltage of the source 18.

As is disclosed in detail in the aforesaid copending application, regulator 16 may be caused to maintain its regulated voltage at a substantially uniform value. In the use of the illustrated thermally responsive indicators 30, 32, and 34, however, improved compensation for the effect of changes in ambient temperature upon the rates at which heat is radiated from these indicators can be achieved by causing the output voltage of the regulator 16 to vary slightly as a function of ambient temperature. The details of how this changing voltage characteristic is achieved in regulator 16 is described in detail in the copending application to which reference is here made for details not found herein. For the purpose of the present invention, it is sufficient to note that the output votlage of the regulator 16 can either be regarded as uniform or as varying slightly as a function of ambient temperature.

The voltage impressed across winding 42, between contact 44 and ground is, of course, equal to the voltage impressed upon the individual gauging circuits 10, 12 and 14. These circuits, therefore, are supplied from the source 18 with pulsating energy at the effective voltage of the regulator 16. Regulator 16 thus effectively serves as a regulator of the voltage impressed across the gauging circuits, and currents drawn by the individual gauging circuits are thus independent of variations in voltage of the source 18.

In the broader aspects of the invention, any of a variety of well-known electroresponsive constructions can be employed in connection with the individual indicators 30, 32 and 34. The diagrammatically shown movable elements whereof may consequently function to commutate circuits, provide visual indications or otherwise. Preferably these indicators are of the well-known temperature compensated, thermostatic type. Each indicator employs a bimetallic element which carries a heater winding. Warping of the bimetallic element actuates an indicator needle in any well-known manner. It will be appreciated that the use of thermostatic indicators is advantageous in that they inherently have some heat capacity which can be matched with the performance of the regulator so that the individual pulsations introduced by the latter into the current supply are integrated by the gauges. In typical cases, the pulsating rate may be between 60 and 90 pulsations per minute. The matched thermal capacities provide a synchronism of displacement of the indicator bimetal with that of the regulator following initial closure of the switch 48 and thereby provides for an accelerated pointer travel to the final point of indication, before the regulator starts its pulsing regulation of voltage. This action is desirable for quicker readings and arises from the fact that during the initial period of lag, the gauging circuits and winding of the regulator are subject to the full unregulated voltage of the source 18.

The liquid level unit 24 in Figure 1 is diagrammatically shown as comprising a resistor 50 disposed to be variably engaged by a grounded contact 52 which in turn is suitably connected to a float 54. As the liquid level rises, the amount of resistor 50 included in gauging circuit 10 is correspondingly reduced, which action, of course, increases the current drawn by the corresponding indicator 30. This current increase raises the temperature of its associated bimetal and causes a corresponding travel of the indicator needle. A reverse action is, of course, caused by the lowering of the liquid level.

In the fluid pressure responsive gauging circuit 12, the indicator 32 is connected to ground through a resistor 60, the value of which is governed by fluid pressures acting against a diaphragm 62. These pressures act through a lever 64 to adjust a contact 66 along resistor 60.

In the temperature measuring circuit 14, indicator 34 is connected to ground through a resistor 68 having a negative temperature coefficient of resistance. Various materials are acceptable for this purpose, one usable material being sold under the trade name "Thermistor." Resistor 68, of course, is located in a region the temperature of which is to be measured and changes in temperature correspondingly affect the position of the needle of the corresponding indicator 34.

As thus far described, it will be recognized that so long as ignition switch 48 is closed, regulator 16 acts to impress across the individual gauging circuits pulsating electrical energy, the effective or root-mean-square voltage whereof is substantially independent of variations in the voltage of the source 18, as well as being substantially independent of the gauging currents which are drawn by the individual gauging circuits 10, 12, and 14. It will also be appreciated that the individual indicators 30, 32, and 34 individually respond to variations in the values of their corresponding rheostatic units 24, 26, and 28, and produce corresponding indications of the associated operating conditions—fuel level, oil pressure, and engine temperature.

In accordance with the present invention, the gauging circuits 10, 12 and 14 are provided, respectively, with signal relays 80, 82, and 84. An additional signal relay 86 is provided to respond to the condition of the generator 20. All of the relays 80, 82, 84, and 86 are arranged to control a flasher 88, which in turn, controls a signal light 90. The signal light 90 is common to all of the signal relays, and so does not indicate which of the signal circuits has reached a critical condition. It does, however, indicate that at least one thereof has reached a critical condition, and by attracting the attention of the operator, leads him to inspect the individual indicators 30, 32, and 34, and the usual ammeter or voltmeter (not shown) associated with the generator, to determine what operating condition it is that requires attention.

Each of the signal relays 80, 82, 84, and 86 is illustrated as being of the thermally responsive type, and comprises bimetallic elements 92, 94, 96, and 98, which carry corresponding heater windings 100, 102, 104, and 106. In this embodiment, windings of relays 80, 82 and 84 are directly connected in series with the corresponding indicators and rheostats, and the winding of relay 86 is connected across the generator 20. Relays 80 and 82 are provided with normally closed contacts a and normally open contacts b. Relay 84 is provided with normally open contacts a, and relay 86 is provided with normally closed contacts a. Relays 80 and 82 also carry additional windings 108 and 110, the purpose of which is described below.

Relay 84, in addition to responding to conditions in the temperature measuring circuit 14, also acts to interpose a delay between the operation of any of relays 80, 82, and 86, and the consequent operation of the flasher 88. For this purpose, relay 84 is provided with a second winding 112.

The flasher 88 may, of course, be of any desired type. As illustrated, it is of the hot wire type, and comprises a frame 114, between the upstanding legs of which a wire 116 is stretched. Wire 116 has a pronounced positive coefficient of expansion and normally the tension thereof is such as to maintain its associated contacts a in separated condition, in opposition to the continuously acting force of the compression spring 118. Full current flow through the wire 116 heats and elongates it, enabling spring 118 to close contacts a. Closure of these contacts short-circuits wire 116, allowing the latter to cool and reopen the contacts.

Flasher 88 is subject to control by normally open contacts a of relay 84. So long as these contacts are open, wire 116 is supplied with current of a low value from the source through switch 48, conductor 120, wire 116, current limiting resistor 122, conductor 124, and lamp 90 to ground. The value of this current is too low to permit closure of contacts a of flasher 88, but it does serve to dimly light lamp 90 and thereby afford a continuous but unobtrusive indication of the condition of the latter.

Coming now to the operation of the signal mechanism, the parts normally occupy the illustrated positions. Closure of switch 48 enables regulator 16 to impress the aforesaid regulated voltage across the gauging circuits. Consequently, indicators 30, 32, and 34 start rising to positions corresponding to the existing values of their associated rheostats 24, 26, and 28. The voltage initially impressed across the circuit by regulator 16 is the existing fluctuating voltage of the source 18. This initially higher voltage serves to rather promptly heat up the regulator 16 and place it in operation. In view of the thermal capacities thereof, the warm-up periods of the indicators 30, 32 and 34 substantially match those of the regulator 16.

At the time of initial closure of switch 48, contacts a of relays 80 and 82 are closed, and these contacts remain closed for a short time thereafter, due to the thermal capacities of these two relays. While closed, relays 80 and 82 each complete a circuit (through wire 128) for winding 112 of relay 84 which thereupon starts to heat bimetallic element 96. The thermal capacities and rates of heat application to relays 80 and 82 and bimetal 96, however, under these conditions, are such that unless either of circuits 10 or 12 are in a critical condition, contacts a of relays 80 and 82 open before contact a of relay 84 closes.

Relay 86 can be set for any prescribed voltage, but is preferably set so as to open its contact a at the voltage normally attained by generator 20 at an engine speed just above idling speed. The thermal delay in relay 86 is also less than that introduced into relay 84. Accordingly, assuming that the generator is in satisfactory condition at the time switch 48 is closed, and that no critical conditions exist in either of circuits 10 and 12, all of relays 80, 82 and 86 will have opened their normally closed contacts a before the heat from winding 112 is able to cause contact a of relay 84 to close. It may be assumed, of course, that the engine temperature is low, in which event winding 104 of relay 84 carries little current and does not heat relay 84 sufficiently to close contacts a thereof.

The rate at which heat is applied by winding 104 is preferably low in relation to the rate at which heat is supplied by winding 112. Consequently, the thermal lag of relay 84 exceeds the thermal lags of relays 80, 82 and 86, even though switch 48 is initially closed at a time when the engine temperature is relatively near the critical value. Under normal conditions, therefore, closure of switch 48 serves only to cause the indicators 30, 32, and 34 to take up appropriate positions and to cause lamp 90 to dimly glow, indicating that it is in operative condition.

In addition to preventing the giving of transient signals immediately following closure of ignition switch 48, the thermal delay interposed by relay 84, also prevents such transient signals from occurring during operation. For example, if the vehicle engine speed remains at an idling value for an appreciable length of time, contact *a* of relay 86 may close. Such closures of short duration, however, such as might be occasioned by a stoppage of the vehicle by a traffic light, are not long enough to cause closure of contact *a* of relay 84. Similarly, momentary closures of contacts *a* of relays 80 and 82 are not effective to give signals.

It will be appreciated, of course, that the delay interposed by relay 84 may be varied between relatively wide limits. For example, to handle normal traffic stoppages, a delay of between 20 and 50 seconds may be desirable, which interval is also ample to take care of the warm-up periods following initial closure of switch 48, as discussed above. It will also be appreciated that by a proper correlation of the rates at which heat is supplied to and can be radiated from the relay 84, as well as of the amount of travel required of the bimetal 96 in closing contacts *a*, the delay in closing of relay 84 may be made very substantially longer than the delay involved in its reopening. Thus, elimination of the critical operating condition can be caused to quite promptly extinguish the warning signal.

Assuming now that the level of the fuel in the tank becomes dangerously low, it will be appreciated that the current in gauging circuit 10 falls to a correspondingly low value and the temperature of relay 80 drops to a value at which contacts *a* thereof close.

Such closure completes an obvious circuit from terminal 126 through bimetallic element 92, contacts *a* of relay 80, and conductor 128, for the winding 112 of relay 84. Completion of this circuit supplies heat to bimetallic element 96 and after a brief delay, causes contacts *a* of relay 84 to close. Closure of these contacts completes a circuit for wire 116 of flasher 88 which includes resistor 122 and, in parallel with the resistance of lamp 90, resistor 130. The thus increased current flowing in wire 116 promptly heats it, enabling spring 118 to close contacts *a* of flasher 88. Closure of these contacts not only short-circuits wire 116, but also connects lamp 90 directly to conductor 120 through conductors 132 and 134. Lamp 90 thus glows at full intensity. The short-circuiting of wire 116 causes it to cool and reopen contacts *a*. The latter action re-initiates the heating of wire 116 and also dims lamp 90. So long, accordingly, as contacts *a* of relay 84 are closed, flasher 88 operates to periodically open and close its contacts *a* and thereby cause lamp 90 to flash.

It is believed to be obvious that a dangerously low oil pressure similarly causes contacts *a* of relay 82 to close and cause a flashing of lamp 90 in the manner above described. Similar comments apply to a generator failure, by virtue of the consequent closure of contacts *a* of relay 86.

It will be noticed that the attainment of a dangerous engine temperature is accompanied by an increase in current in the corresponding gauging circuit 14. This fact makes it possible to give relay 84 its combined function of responding to temperature conditions, and of interposing delays in the flashing action of lamp 90, following operation of any of relays 80, 82, and 86. More particularly, it will be noted that if the temperature reaches a dangerous value, the current in winding 104 rises to a high enough value to independently cause closure of contacts *a* of relay 84 and thereby produce the flashing action of lamp 90 in the previously described manner.

It will be appreciated that lamp 90 may be caused to respond to operating conditions other than those discussed above, either through the flasher 88, or independently thereof. As an example of a control for lamp 90 which is independent of flasher 88, lamp 90 is illustrated as being directly subject to a normally open switch 136, which may, for example, be controlled by the usual hand brake. This switch is open when the hand brake is released, and is closed when the hand brake is applied. Lamp 90 burns continuously and brightly so long as the hand brake is applied, and switch 48 is closed.

Coming now to the remaining details of construction of the signal mechanism, and with reference first to relay 80, it will be noticed that the winding 100 thereof absorbs a portion of the output voltage of regulator 16. If this relay is so designed in relation to the balance of circuit 10 that the voltage drop appearing across the winding 100 is always a negligibly small percentage of the voltage of regulator 16, it will be appreciated that relay 80 can be added to or cut out of the corresponding gauging circuit, without appreciably changing the current flowing therein.

In accordance with present practice, however, in order to insure reliable operation of relay 80, it is preferred to so design it that it consumes an appreciable percentage of the power consumed in the corresponding gauging circuit. This is particularly important in view of the fact that relay 80 is designed to operate at minimum values of current in the corresponding gauge circuit. In a typical case, it is preferred that winding 100 have a resistance of approximately 8 ohms. At the critically low fuel level values, the setting of rheostat 24 may be such as to interpose approximately 70 ohms in the corresponding circuit 10. Finally, under these conditions, the resistance of indicator 30 may amount to approximately 12 ohms. In such case, gauging circuit 10 may have a total resistance of approximately 90 ohms, of which 8 ohms appear in winding 100.

On the other hand, when the fuel tank is full, the effective resistance of rheostat 24 may be of the order of 10 ohms. At this higher current, the resistance of indicator 30 may be 15 ohms. In this instance, as thus far described, the overall resistance of gauging circuit 10 amounts to 33 ohms. The 8 ohm winding 100 thus represents a very considerably higher percentage of the overall resistance of the circuit at high fuel levels than at low fuel levels.

It will be appreciated that if indicator 30, rheostat 24, and signal relay 80 are designed to be always used together, rheostat 24 can be so designed, and indicator 30 can be so calibrated, as to eliminate the effect of the change in the percentage of the source voltage which would be absorbed by winding 100. In such a case, however, elimination of the signal relay 80 would throw the gauging circuit out of adjustment. The voltage of regulator 16 could, of course, be adjusted to bring the system back to balance at some selected point on the scale, but the system would still be out of balance at all other points along the scale.

With the foregoing considerations in view, a further and important feature of the present signal mechanism resides in so arranging the relay 80 that the effective impedance (specifically the resistance, in the illustrated direct current systems) thereof progressively decreases as the corresponding gauging currents increases. This progressive decrease in resistance serves to enable the signal mechanism to be added to a gauging system comprising only the indicators and the rheostats, as an accessory, by the simple expedient of increasing the output voltage of regulator 16, without noticeably disturbing the calibration of the system at any point along the entire scale from minimum to maximum current.

Broadly speaking, and depending upon the requirements of the particular system, the points along the scale at which full compensation is desired, and the permissible range of departure from full compensation, the maximum and minimum values of resistance of relay 80 may be widely varied. In the present examples, a range from a maximum of 8 ohms to a minimum of 2 ohms is assumed for purposes of detailed explanation. Such explanation will serve to illustrate the applicability of other ranges under appropriate conditions.

More particularly, relay 80 is provided with the aforesaid normally open contacts *b*, and the aforesaid secondary winding 108. So long as contacts *b* are open, winding 108 is disconnected. So long, however, as contacts *b* are closed, winding 108 is connected in parallel with its associated winding 100. With the two windings thereof connected in parallel, the resistance of relay 80 is, of course, materially diminished.

In the aforesaid typical case, at zero scale reading indicator 30 may have a resistance of approximately 12 ohms and rheostat 24 may have a corresponding resistance value of approximately 70 ohms. Neglecting, or in the absence of, relay 80, regulator 16 may be set to produce a voltage of approximately 5 volts, giving a zero scale current of approximately 60 milliamperes. At full scale reading, on the other hand, rheostat 24 may have a resistance of 10 ohms, an indicator 30 may have a resistance of 15 ohms, in which event the 5 applied volts produce a gauging current of approximately 200 milliamperes.

Assuming that winding 100 of relay 80 has, as aforesaid, a resistance of 8 ohms, and that substantially full compensation for the addition of relay 80 is desired at the zero scale position, it will be appreciated that the voltage of regulator 16 should be increased to approximately 5.4 volts, which will cause a current of approximately 60 milliamperes to flow through the approximately 90 ohms of resistance now represented by winding 100, indicator 30, and rheostat 24.

Assuming now that the fuel level gradually rises, the temperature of relay 80 will also gradually rise. It is usually preferred to have contacts *a* open at a fuel level approximately 5% of full value. The opening of contacts *a* of relay 80 is, of course, without effect except to interrupt the flashing of lamp 90, in the previously described manner. This 5% point may correspond, for example, to approximately 65 milliamperes in the gauging circuit.

In order to insure against transient operations of the relay contacts, it is preferred to so space the fixed contact elements *a* and *b*, that the normally open contacts *b* do not initially close until the gauging current rises to, for example, 85 milliamperes. As soon as these contacts *b* close, they connect windings 100 and 108 in parallel with each other. In the typical case now being described it is also desired that full compensation be provided at the full scale 200 milliampere point. Thus winding 108 may have a resistance of approximately 2.66 ohms, in which event the network resistance of windings 100 and 108 is equal to 2 ohms.

The drop in resistance of relay 80 from 8 to 2 ohms (caused by closure of contacts *b* of relay 80) slightly increases the current in the gauging circuit 10. However, at the 85 milliampere current value, the resistance of elements 30 and 24 still amounts to in excess of 60 ohms. The increase in current drawn by relay 80 is thus considerably more than offset by the drop in resistance of relay 80 and the wattage consumed by relay 80 falls to too low a value to maintain contacts *b* closed. These contacts, therefore, rather promptly reopen, re-establishing the 8 ohm value for relay 80 and causing the contacts *b* to again close. Since 85 milliamperes through 8 ohms is just sufficient to cause contacts *b* to close, it will be appreciated that at the 85 milliampere point, contacts *b* are open almost all the time and are closed only a very minor percentage of the time. At this critical operating point, accordingly, which may correspond to about the 10% point on the indicator scale, the effective resistance of relay 80 may still be regarded as being 8 ohms. Thus, from the 60 milliampere point to the 85 milliampere point, the resistance of relay 80 remains unchanged and a slight and progressively increasing unbalance in the calibration of the indicator 30 occurs throughout the range from 60 to 85 milliamperes. This unbalance is, however, negligibly small. For example, in the absence of relay 80, and with the voltage of regulator 16 set at 5 volts, the 85 milliampere value obtains. With the addition of 8 ohms (relay 80) and an increase in the voltage of regulator 16 from 5 to 5.4 volts, a gauging current of between 82 and 83 milliamperes is obtained. This error is well within commercial tolerances, and is on the safe side. The net change in the scale reading of indicator 30 does not exceed 2%.

As the liquid level rises in the tank, the resistance of rheostat 24 progressively decreases, and the value of the gauging current, of course, increases. As the gauging current increases, contacts *b* of relay 80 remain closed throughout progressively longer intervals of time. This is, of course, because relay 80 cannot absorb more than a fixed numer of watts (for example, approximately six-hundredths of a watt in the example now being given) unless and until such a time as the gauging current rises to a value at which contacts *b* remain continuously closed. In the present example, this critical condition is not reached until approximately the 170 milliampere point on the scale.

In the example now being given, and at approximately the 130 milliampere point, the effective resistance of relay 80 assumes a value which is just compensated for by the change in voltage of regulator 16 from 5 to 5.4. To make the point clear, in the absence of relay 80, and at 5 volts, the gauging current attains a value of approximately 130 milliamperes at a time when rheostat 24 represents about 25 ohms and the resistance of indicator 30 is at about 13.25 ohms. At 130 milliamperes, the effective resistance of relay 80 is approximately 3.50 ohms. It will be obvious that 5 volts produces the same gauging current through 38.25 ohms of resistance as is produced by 5.4 volts through 41.75 ohms of resistance. Throughout the range, therefore, from 85 milliamperes of gauging current to 130 milliamperes of gauging current, the slight error present at the 85 milliampere point gradually diminishes and disappears at approximately the 130 milliampere point.

As aforesaid, at and above approximately 170 milliamperes of gauging current, contacts *b* of relay 80 remain continuously closed, since the wattage consumed at 170 milliamperes and 2 ohms is sufficient to hold the contacts closed. From this scale point on, the resistance of relay 80 remains fixed at its minimum value of 2 ohms. At the 170 milliampere point on the scale, and with the indicated design factors, a slight error (of the order of one milliampere) in the reading of gauge 30 is produced, which slight error gradually disappears as the gauging current falls towards the aforesaid 130 milliampere reading.

At full scale reading, corresponding to approximately 200 milliamperes, the system is again in balance. Under these conditions, as aforesaid, indicator 30 represents about 15 ohms and rheostat 24 represents about 10 ohms, enabling 5 applied volts to produce the 200 milliampere gauging current. Under these same conditions, two additional ohms in relay 80 are just compensated for by the increase in voltage of regulator 16 from 5 to 5.4 volts. The slight error thus present at the 170 milliampere reading thus gradually decreases as the gauge readings increase, and ultimately disappears at full scale reading.

The foregoing remarks have assumed that the established voltage of regulator 16 (5 or 5.4 volts) remains uniform throughout the full range from minimum to maximum gauging currents. As aforesaid, in the interest of more fully eliminating the changes in the rates at which heat is radiated from the indicators, resulting from changes in ambient etmperature, it is preferred to so design the regulator 16 as to cause it to have a voltage characteristic which rises slightly with increases in ambient temperature. Such a rising characteristic adds proportionately to the initial five volts, or 5.4 volts, as the case may be, and normally does not exceed one-tenth of a volt. Such a rising characteristic makes no substantial change in the direction and degree to which the addition of the signal relays alters the calibration of the system.

In the example thus far given, a desirable degree of compensation throughout the full range from zero to full scale reading of the indicator is accomplished by selecting a minimum resistance value for the signal relay which is attained at an intermediate scale point, and which remains fixed from that point throughout the remainder of the scale. It will, of course, be appreciated that in certain instances design factors may make it desirable to advance or delay the scale point at which the minimum resistance value is attained. If the minimum resistance value is increased, the effect is, of course, to cause the signal relay to attain its minimum value of resistance at a lower point along the scale. Decreases in the minimum resistance have the opposite effect, and cause the minimum value of resistance to be attained at a higher point along the scale. In certain instances, also, the design factors may be such that the most desirable compensation is achieved by selecting a resistance value for winding 108 which is so low that the signal relay continues to pulsate (i. e., open and close its contacts $b$) throughout the full range of movement of the indicator, and thus never attains a stable minimum value. In such cases, the effective resistance of the signal relay continuously decreases from the scale point at which contacts $b$ of relay 80 initially close throughout the balance of the movement of the indicator 30. Such cases are exemplary of those in which the resistance of the secondary winding 108 of the signal relay resistance approaches or reaches zero. In the latter instance contacts $b$, when closed, directly short-circuit the main winding 100.

In practice, accordingly, maximum and minimum resistance values for relay 80 are chosen which enable it to absorb a desirably large amount of power, and which, while giving full compensation at desired points along the scale, maintain the range of departure from full compensation, at intermediate scale readings, within commercially acceptable limits.

As aforesaid, relay 82 may be and preferably is a structural duplicate of relay 80. Consequently, the discussion of the functioning of relay 80 and circuit 10 will serve as a description of the action of relay 82 and circuit 12. No question of voltage balancing is involved in connection with the relay 86. Consequently, only a single winding is provided on this relay.

If desired, winding 104 of relay 84 may be provided with a companion winding for connection in parallel therewith, as described in connection with relay 80. Since, however, accurate readings of the temperature indicator are important only at the higher scale positions, it is preferred to provide relay 84 with only a single winding 104, having a resistance of approximately 2 ohms. As described in connection with relay 80, 2 ohms at the 170 milliampere scale point, brings the system very nearly into balance, and brings the system exactly into balance at the 200 milliampere point. Throughout a range starting well below the danger zone on the temperature indicator, accordingly, circuit 14 is in balance or very nearly so. Thus, in practice, the single 2 ohm winding on relay 84 fully meets commercial needs.

The embodiment shown in Figure 2 is much like that of Figure 1, but employs a slightly different type of flasher. In Figure 2, the flasher 150 is provided with fixed contacts $a$ and $c$ and a movable contact $b$. Under normal conditions, contact $b$ engages contact $c$. Contact $a$ is connected to ground through one path which includes a warm-up resistor 152, and a parallel path which include the contacts $a$ of relay 84. Contact $c$ is permanently connected to ground through a dimming resistor 154.

As to operation, closure of the ignition switch 48 causes the actions previously described of the associated regulator, the gauges 10, 12, and 14, and their associated signal relays 80, 82, 84, and 86, all of which are shown in Figure 1. Additionally, as shown in Figure 2, closure of the ignition switch 48 completes a dimming circuit for the lamp 90, and a warm-up circuit for the hot wire 116 of the flasher 150. These circuits extend from the source through switch 48, lamp 90, to terminal 156. One branch of the circuit extends from terminal 156, through wire 116 and warm-up resistor 152 to ground. The other branch extends from terminal 156 through flexible conductor 158, now closed contacts $b$—$c$, and dimming resistor 154, to ground. With this arrangement, it will be noticed that resistors 152 and 154 may be adjusted so as to provide a desired dimmed intensity for lamp 90 and at the same time limit the heating current through wire 116 to a value which maintains it below but as near as may be desired to the critical operating temperature.

Assuming now that a critical condition is reached in one of the gauging circuits, contacts $a$ of relay 84 close as described with reference to Figure 1. Such closure shunts resistor 152 and increases the current through wire 116. This action enables spring 160 to separate contacts $b$—$c$ and close contacts $a$—$b$. This latter action brings the lamp 90 to maximum intensity, and by shunting wire 116, allows the latter to cool. The cooling of wire 116 is as before followed by return movement of the contact $b$, re-initiating the cycle. So long, therefore, as contacts $a$ in relay 84 remain closed, lamp 90 flashes. As before, switch 136 is provided to afford a direct continuous connection for lamp 90, and may be associated with, for example, the hand brake of the associated vehicle.

The system of Figure 3 is, in a generic sense, functionally equivalent to the system of Figure 1, but employs a flasher unit 170 which is itself capable of providing the time delay feature which, in the systems of Figures 1 and 2, is provided by relay 84. Accordingly, in Figure 3, the signal controlling contacts $a$ of relays 80, 82, and 86, are directly connected to line 128', which supplies winding 172 of flasher 170. Relay 84', which replaces the previously described relay 84, is provided with only a single winding 104 which is associated with the temperature measuring circuit 14 in the previously described manner. In this instance, contacts $a$ of relay 84' supply winding 172 through conductor 128'.

Flasher 170 comprises a bimetallic body 174, which carries the previously described winding 172 and a companion winding 176. Neither winding 172 nor 176, acting alone, is effective to close contacts $a$ of flasher 170. If both windings are energized at the same time, however, sufficient heat is supplied to body 174 to close contacts $a$.

The parts are shown with their contacts in the positions normally occupied thereby, contacts $a$ of relays 80, 82, and 86 being closed, and contacts $a$ of relay 84', being open. Closure of switch 48 thus immediately completes the circuit for both of windings 172 and 176. The former circuit includes the parallel connected contacts $a$ of relays 80, 82, and 86, and conductor 128'. The circuit for winding 176 extends directly from switch 48 through conductor 178. Both windings 172 and 176 being energized, the temperature of body 174 starts to rise. The timing of this unit is, however, such that before contacts $a$ thereof close, contacts $a$ of relays 80, 82, and 86 open, unless one of the associated circuits 10 and 12 is in a critical condition, or the generator has failed. It may be assumed, as before, that the engine temperature is low, and that, consequently, contacts $a$ of relay 84' remain open.

The current flowing through winding 176 also flows through the lamp 90, causing the latter to be dimly lighted and indicate its operative condition.

Assuming now that a critical condition exists in one or more of the signal relay circuits, one or more of contacts *a* of relays 80, 82, 84', and 86 close. Closure of any one of these contacts again energizes winding 172 which, with winding 176, raises the temperature of body 174 sufficiently to close contacts *a*. When this action occurs, a full-intensity circuit is completed for lamp 90, through conductor 178, the body 174, and contacts *a* of flasher 170. Closure of these contacts also short-circuits winding 176, thereby reducing the heating effect on body 174, and causing the contacts to reopen. So long as any one or more of the signal relay contacts *a* are closed accordingly, lamp 90 flashes and indicates the existence of the critical condition.

The system of Fig. 4 duplicates that of Fig. 3 with the exception that it employs a flasher 88, of the previously described type, which is under the control of a thermally responsive time delay relay 171. More particularly, the control conductor 128' is energized as shown in Fig. 3, and leads to ground through the winding 173 of the thermal relay 171.

The illustrated dimming circuit for lamp 90 is connected to the source through conductor 178, and includes the dimming resistor 179, the effective value of which is controlled by an adjustable terminal 181. As shown, the flasher 88 receives no current unless and until contacts *a* of relay 171 close. With this arrangement, the dimmed intensity of lamp 90 may be adjusted as desired without introducing any possibility of undesired operations of the flasher 88.

If a critical condition in one of the gauging circuits persists for a sufficiently long time, relay 171 closes its contacts *a*. Such closure causes sufficient current to flow through wire 116 of flasher 88 to cause it to close its contacts *a*, bringing lamp 90 to full brilliance. Such closure of contacts *a* of flasher 88 also short-circuits wire 116, which results in a reopening of such contacts *a*. So long, therefore, as contacts *a* of relay 171 remain closed, flasher 88 produces a flashing action of lamp 90.

Fig. 4 is also illustrative of various ways to selectively control the dimmed intensity of lamp 90 and the supply of warm-up current to the flasher 88. For example, if desired, terminal 181 may be disengaged from terminal 179, and terminal 183 may be engaged with resistor 175. In this instance, the setting of terminal 183 determines both the dimmed intensity of lamp 90 and the supply of warm-up current to flasher 88. Again, by causing both terminals 181 and 183 to engage their associated resistors 179 and 175, these terminals may be independently adjusted to provide desired and substantially independent settings for the dimmed current through lamp 90 and the warm-up current through flasher 88.

As before, a hand-brake switch 136 is desirably provided. With transfer switch 185 in the illustrated position, switch 136 provides for continuous operation of lamp 90, independently of the flasher. Movement of switch 185 to the dotted line position, however, connects switch 136 in parallel with contacts *a* of relay 171, and enables switch 136 to produce the same action as is produced by a closure of contacts *a* of relay 171.

Figure 6:
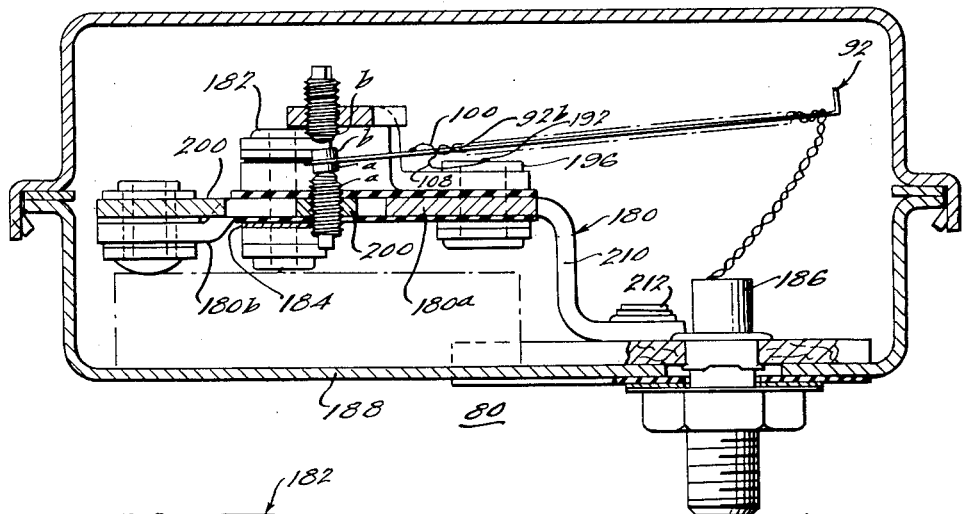
Fig. 6 is a view in vertical section taken along the line 6—6 of Fig. 5.
Figures 5A, 7:
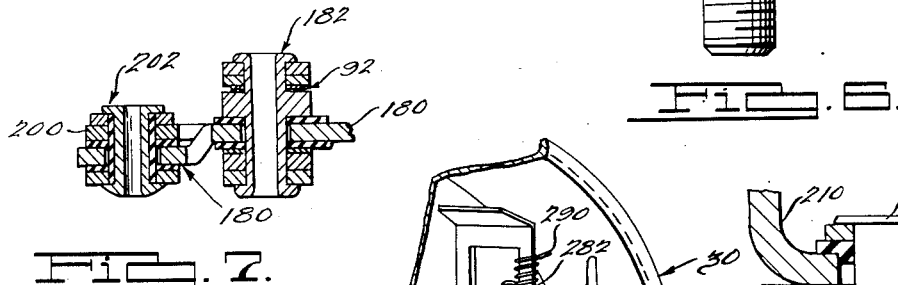
Fig. 5A is a fragmentary view in vertical section taken along the line 5A—5A of Fig. 5.
Fig. 7 is a fragmentary view, in vertical section, taken along the line 7—7 of Fig. 5.

It will be appreciated that as many as may be desired of the above described control elements, with the exception of the rheostats 24, 26, and 28, and indicators 30, 32, and 34 may be combined into a unitary enclosure. In case the signal control mechanism is to be sold as an accessory, it may, of course, be separately enclosed. It will also be appreciated as aforesaid, that the individual elements of the system may embody any of a variety of different constructions. A presently preferred construction for relays 80 and 82 is shown in Figures 5, 6, and 7. Relays 84 and 86 may, of course, employ the same construction, except for the previously noted differences.

Referring now to Figs. 5, 6, and 7, the bimetallic element 92 of relay 80, is illustrated as being of U-shaped form, having legs 92*a*, 92*b*, and a connecting bridge 92*c*. Leg 92*a* is supported on a base plate 180, by means of a terminal assembly comprising rivet 182. As best shown in Fig. 7, this terminal assembly includes insulating elements, which insulate the bimetallic element 92*a* from the base, but electrically connect it to a bus bar 184 fragmentarily shown in Fig. 5, and which may correspond to conductor 127 in Fig. 1.

The other leg 92*b* of bimetallic element 92, carries the previously described windings 100 and 108, and also carries the previously described electrically interconnected moving contact elements *a—b*.

It will be appreciated that the above-described U-shaped construction of element 92 renders the relay 80 substantially insensitive to changes in ambient temperature, since such changes affect both legs 92*a* and 92*b* in the same sense and cause the bridge portion 92*c* to move, without, however, causing any substantial movement of the contact carrying end of leg 92*b*. Currents flowing in the windings 100 and 108, however, serve to elevate the temperature of leg 92*b* relative to that of leg 92*a*, and cause the previously described opening and closing movements of contacts *a* and *b*.

The two windings 100 and 108 lead to the common terminal 186, which, as appears in Fig. 6, is insulated from the enclosing case 188. Terminal 186 is indicated diagrammatically in Fig. 3, as being located between relay 80 and indicator 30. The other end of coil 100 is, as previously described, welded to the leg 92*b*, as indicated at 190. The free end of coil 108 is welded, at 192, to a terminal bracket 194, which carries the adjustably fixed contact element *b*. Bracket 194 is generally Z-shaped, and is riveted at 196, to the base plate 180, but is insulated therefrom as appears in Fig. 6.

The other fixed contact element *a* is adjustably carried by a conducting member 200, which in turn, is secured to, but insulated from, base 180, by the terminal assembly 202. Conducting member 200 may correspond to conductor 128, described in connection with Fig. 1, and, in a unitary signal control mechanism, serves as a bus bar which interconnects the fixed contacts *a* of several of the signal relays.

It is noted that the base plate 180 has a substantially flat body portion 180*a*, and a depressed shelf portion 180*b*, which is overlaid by the conducting member 200. The body 180*a* is cut away as indicated at 180*c* in Figure 5, to accommodate the laterally projecting portion 200*a* of conducting member 200. Base 180 is also provided with a plurality of downwardly projecting legs 210 which are secured to but are insulated from, the bottom half of the enclosing case 188, by an insulated rivet assembly 212.

Referring now to Figures 8 through 11, in a presently preferred form, the elements of regulator 16 are mounted within a sealed enclosure constituted by upper and lower cup-shaped members 220 and 222 which may, for example, be formed of lightweight metal stampings. Preferably, and as illustrated, a sealing gasket 224 is interposed between these casing members. Element 40 is illustrated as being of U-shaped form, having one leg 226 which carries the previously identified winding 42, and a companion compensating leg 228. Leg 228 is anchored at one end to a headed rivet 230 which serves to electrically connect leg 228 to the exposed terminal 232. It will be appreciated that changes in ambient temperature conditions have like effects upon the two legs 226—228 and cause the connecting bridge 234 to rise and fall, without (except as noted below) altering the position of the contact 44. Current flowing in winding 42, on the other hand, causes leg 226 to warp relative to leg 228 and move contact 44.

For mounting stability terminal 232 has a laterally extending, downwardly deflected leg 236 which is held in place by the companion rivet 238. Terminal 232 of Figures 8 through 11 thus corresponds to the diagrammatically shown terminal 238 in Figure 1.

As aforesaid, the free end of leg 226 carries the previously identified movable contact 44. The companion fixed contact 46 is carried near one end of the free leg 240 of a U-shaped spring strip 242. Leg 240 extends parallel to and is immediately above the leg 226, as viewed in Figures 9 and 10. The other leg 244 of spring strip 242 is anchored to the casing by the previously identified rivet 238, and is electrically connected thereby to the companion terminal 250. Terminal 250 is diagrammatically indicated in Figure 1 and is provided with an upstanding lug for connection to an input lead. As in the case of terminal 232, terminal 250 is provided with a laterally extending downwardly deflected leg 252 which is anchored in place by the previously identified rivet 230.

The mounting spring strip 242 for the fixed contact 46 is preformed so that it tends to bow downwardly as viewed in Figure 9 and press against the movable contact 44, thereby preloading the element 40. The free end of leg 240 of spring strip 242 cooperates with an adjustable stop 254 which limits the downward movement thereof and which, it will be appreciated, can be adjusted as an incident to final inspection to determine the amount of preloading of the bimetallic element. This adjustment determines the temperature which the regulator must attain in order to effect a separation of the contacts, and, consequently, determines the regulated voltage of the system. Adjusting screw 254 is carried by an L-shaped mounting member 256 which is carried by the rivet 230 but is insulated therefrom, as well as from the bimetallic element 40, by insulators 258 and 260.

Rivet 230 also carries, in electrical contact with the element 40, a resistor mounting clip 262. A companion clip 264 is carried by rivet 238, in electrical contact with the mounting spring strip 242, which carries the fixed contact 46. Mounting clips 262 and 264 are thus electrically connected, respectively, to the contacts 44 and 46, and may serve as a mounting for a resistor or other modulating element (not shown) if it is desired to connect such an element in parallel with contacts 44—46. Such an element, of course, does not alter the regulated voltage of the unit. Clips 262—264 may also serve as a convenient means of connecting a condenser or other means across contacts 44—46, for the purpose of suppressing any tendency of the action of contacts 44—46 to cause radio interference. Similar suppression for relays 80—82—84 and 86 can be effected, for example, by connecting condensers across the contacts thereof.

As previously noted, one end of heater winding 42 is spot welded or otherwise electrically connected at 270 to the bimetallic leg 226, and the other end is correspondingly grounded to the casing at 272. The casing as a whole may be mounted, and grounded, by bracket 274.

With further reference to the effect upon the elements of the present system, of substantial changes in ambient temperature, it will be appreciated that, as aforesaid, the regulator 16 acts to maintain a leg 226 thereof at a substantially uniform average temperature, just high enough above ambient temperature to maintain contacts 44—46 in a condition of incipient opening and closing. The rate of exchange of heat between any two bodies (for example, trimetallic element 40 and its enclosing casing) is, of course, proportional to the difference between the fourth powers of the respective absolute temperatures of the bodies. On this basis, the rate of heat loss from leg 226 increases with increases in ambient temperature, and vice versa. Consequently, in order to maintain the aforesaid average temperature of leg 226, the rate at which electric energy ($E^2/r$) is supplied to winding 42 must increase with increases in ambient temperature, and vice versa.

Assuming that the resistance of winding 42 is independent of ambient changes, it will be appreciated that this increase in wattage is accomplished by an increase in the effective voltage of the energy pulsations received by winding 42. More particularly, the ratio of the effective voltages at two different ambient temperatures is equal to the square root of the ratio between the wattage requirements of the regulator at the same two ambient temperatures.

The rising or falling effective voltage characteristic of the regulator, resulting from the increase or decrease in wattage requirements of the regulator, which accompany increases or decreases in ambient temperature can, of course, be increased by utilizing a heater winding 42 which has a positive temperature coefficient of resistance. This is because increases in resistance of the winding 42, for any given wattage requirement, must be accompanied by an increase in the effective voltage of the regulator, and vice versa.

Also, the aforesaid rising or falling voltage characteristic of the regulator may be increased or decreased by adjusting the length of the compensating leg 228 relative to the length of the operating leg 226 so as to, in effect, over or undercompensate the regulator. More particularly, if compensating leg 228 is shorter than leg 226, the regulator would, in the absence of the varying rate of heat loss occasioned by ambient changes, have a voltage characteristic which falls in response to increases in ambient temperature, and vice versa. Conversely, if leg 228 is longer than leg 226, the regulator would, even in the absence of the changed rate of heat loss, have a rising voltage characteristic in response to increases in ambient temperature, and vice versa.

It will be appreciated, therefore, that the normal rate of change in the effective voltage of the regulator, occasioned only by the varying rate of heat loss, can be either increased, reduced, or, in fact, reversed, depending upon the temperature coefficient of resistance of the winding 42 and the relative proportioning of the trimetallic legs 226 and 228.

Figure 12:
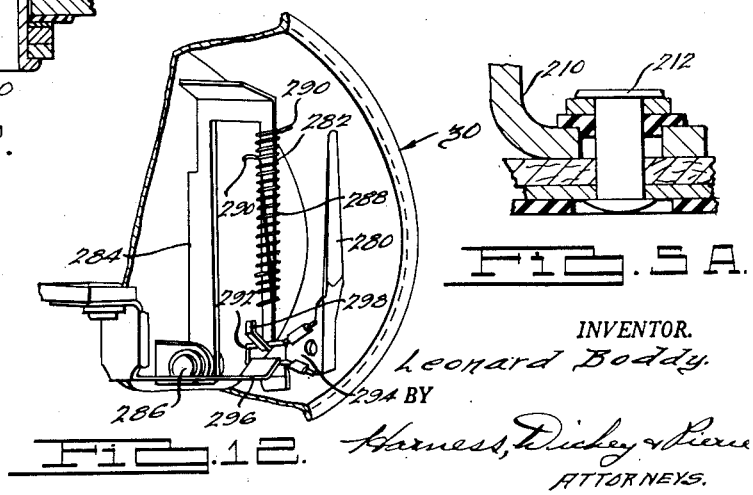
Fig. 12 is a view in perspective of a preferred construction of electrical indicator.

A presently preferred indicator construction is shown in Fig. 12. In Fig. 12 the indicator 30 includes a pointer 280 which indicates distortion of the bimetallic strip or actuator member 282 in amplified form. Member 282 may include an ambient temperature compensating leg 284 which is riveted at 286 or otherwise suitably secured to the indicator casing. A heater coil 288 surrounds the bimetallic member 282 and has leads 290 which are diagrammatically indicated in Figure 1. A variation in current changes the temperature of the strip 282 which therefore warps to assume a predetermined position dependent upon its temperature.

The illustrated means for suspending and operably connecting the pointer 280 to the strip 282 includes a substantially U-shaped hairpin 292 having the ends of its upper and lower cylindrical legs flared outwardly. The pointer 280 has a tapered transverse flange 294 formed thereon and extending normally to its plane of pivotal movement, and the edges of this flange are bent around the flared pin portions to securely clamp the hairpin 292 to the pointer. The pin 292 has a resilient pivotal connection which may comprise a tensor or spring strip 296 that has one end fixed in a suitable manner to the casing and the other end provided with a V-shaped hook portion that opens downwardly and seats the lower leg of pin 292. The strip 282 may have its extreme lower end bent backwardly at an acute angle to provide a hook portion 298 which opens upwardly (or points downwardly) and has the upper leg of pin 292 seated in the apex thereof. The assembly of hairpin 292, actuator 282, and tensor 296 is made so that the latter element exerts a slight yieldable downward force thereon to hold the pin legs seated in their respective hook portions. This assembly is preferably also made so that in the zero position the plane of the hairpin 292 is substantially normal to that of the tensor strip 296 thus enabling the pointer 280 to be forced in either direction without relaxation of the spring load on the hairpin.

Figs. 13–20 show a modified and presently preferred construction of signal relay and also serve as an illustration of a structure wherein only one heater winding is provided and which is short-circuited by closure of the associated normally open relay contacts. This structure, consequently, is one of the previously discussed types wherein the effective resistance of the signal relay progressively decreases, from the point of initial closure of the contacts b thereof, throughout the balance of the scale.

In Figs. 13-20 the signal relay comprises a bimetallic member 300, of the previously described U-shaped form. The end of one of the bimetallic legs 302 is anchored to, but insulated from, the relatively heavy metallic base 304 by means of a terminal stack 306, shown in detail in Fig. 17. This stack includes insulators 308 and 310 which, respectively, overlie and underlie the base 304. Stack 306 also includes a flexible contact element 307 (Figs. 15 and 17) which may correspond, for example, to terminal 126 of Fig. 3. In continuing a plurality of signal relays into a unitary structure, element 307 may be part of an elongated conductor which electrically interconnects a series of the relays and which corresponds to conductor 127 of Fig. 3.

The other leg 312 of bimetallic member 300 carries the heater winding 314, one end 316 whereof is electrically connected to the leg 312, as indicated at 316, and the other end whereof is electrically connected at 318 to a terminal 320. As most clearly appears in Fig. 15, terminal 320 is carried by a terminal strip 322, formed of insulating material. Terminal 320 comprises a threaded shank 324 which cooperates in positioning the illustrated unit within its enclosing casing (not shown) and also serves as a binding post to receive the associated supply conductor. It thus corresponds, for example, to terminal 186 of Fig. 3. An aforesaid unitary structure embodying several signal relays would, of course, be provided with a terminal 186 individual to each relay, as shown in Fig. 3.

The base 304 is also supported by the terminal strip 322, and for this purpose base 304 is provided with spaced downwardly and laterally offset legs 326, which are riveted to the strip 322 as indicated at 328. One of these legs is shown in Figs. 13 and 14.

The bimetallic leg 312 also carries a pair of contacts 330 and 332 which are electrically connected to each other and to the leg 312. Contact 330 cooperates with a normally fixed but adjustably positioned contact 334 which is threaded into one end of a metallic terminal supporting bracket 336. The other end 338 of bracket 336 is anchored to, but insulated from, the base 304 by means of a terminal stack 340.

As previously mentioned, closure of contacts 330—334 serves to short circuit heater winding 314. Consequently, terminal stack 340 is directly connected to the previously mentioned terminal 320 by means of a strip-like conductor 342. It will be appreciated that, as an incident to final inspection, the screw-like terminal 334 is adjusted up and down to correspondingly determine the distance which contact 330 must move upwardly in order to cause closure of contacts 330—334. This adjustment, of course, determines the scale reading at which the progressive decrease in effective resistance of the signal relay is initiated.

The other moving or movable contact 332 cooperates with an adjustably fixed terminal 344 which is threaded into the base 304 and is consequently electrically connected thereto. In an aforesaid unitary structure comprising a series of the signal relays, base 304 thus serves as a bus bar which corresponds, for example, to conductor 123' of Fig. 3.

It will be appreciated that the adjustment of terminal 344 serves to determine the minimum or critical gauging current value to which the signal mechanism responds. This adjustment is made as an incident to final inspection, and a feature of the present construction resides in the provision of an improved locking mechanism for insuring against inadvertent displacement of terminal 344 from its adjusted position. This same locking mechanism, though illustrated only in connection with terminal 344, may, if desired, be used in connection with terminal 334.

More particularly and as is perhaps best shown in Figs. 19 and 20, the base 304 is cut away to define a recess 350, and is also provided with two slots 352 and 354 which open into the recess 350. The threaded opening which receives terminal 344 is intersected by slot 352. The slot 354 is provided with an enlarged portion defined by the arcuate surfaces 356 and 358, which surfaces terminate in stop shoulders 360 and 362. This enlarged portion receives a locking member 364, which has upper and lower similar flatted sections 366 and 368. These portions can be interchangeably used as locking portions and as tool receiving portions. In the position shown in Fig. 20, locking member 364 is in its locked position, in which it has forced the tongue 370, which lies between slots 352 and 354, into positive locking engagement with terminal 344. Locking member 364 can be turned through a 90° angle in a counterclockwise direction from the position shown in Fig. 20. Such turning causes the sides thereof to abut the straight slot surfaces 372 and 374, the free spacing between which is slightly in excess of the width of the locking portion 368. Such turning consequently enables the tongue 370 to spring back to the dotted line position, freeing terminal 344 from the previously described wedging engagement and permitting it to be readily turned to a desired adjusted position.

The curvature of surfaces 356 and 358 is preferably such that an over-center action is produced in turning locking member 364 between its illustrated locked position and the just mentioned unlocked position. More particularly, this curvature is such that the maximum displacement of tongue 370 occurs at an intermediate stage of the turning movement of member 364. This over-center action thus serves to yieldingly retain locking member 364 in the locked position. When it is in the unlocked position it can, of course, be freely withdrawn from slot 354.

Although only several embodiments of the invention have been described in detail, it will be appreciated that further modifications may be made without departing from the spirit and scope of the invention.

What is claimed is:

1. In a gauging system, a current-responsive gauging element variously responsive to a variable current therethrough, a current-responsive signal element operable to produce an action in the event the rate at which electric energy is supplied thereto reaches a predetermined value and embodying a current consuming part, said signal element embodying adjusting means associated with said part to vary the impedance of said signal element as a function of the current supplied thereto, and control means coupled to said elements and responsive to a physical condition to be gauged for concurrently varying the flow of current through said elements.

2. The structure of claim 1 wherein said elements are thermally responsive and so respond to average rates at which current is supplied thereto.

3. The structure of claim 1, including circuit connections electrically connecting said elements and said control means in series circuit relation with each other.

4. In a gauging system, a plurality of current-responsive gauging elements each embodying a current consuming part, at least one of said elements further embodying adjusting means associated with the corresponding part to vary the impedance of that element as a function of the current supplied thereto, and control means coupled to said elements and responsive to a physical condition to be gauged for concurrently varying the flow of current through said elements.

5. The structure of claim 4 wherein said elements are thermally responsive and so respond to average rates at which current is supplied thereto.

6. Electrical relay mechanism actuable by current flow therethrough, comprising a current consuming element for cooperating in actuating said mechanism, and means associated with said element and actuable by said mechanism for progressively and gradually varying the impedance of said mechanism to said current flow in response to progressive and gradual changes in the value of said current flow.

7. Electrical relay mechanism actuable by current flow therethrough, comprising a current consuming element for cooperating in actuating said mechanism, means associated with said element and actuable by said mechanism for progressively and gradually varying the impedance of said mechanism to said current flow in response to progressive and gradual changes in the value of said current flow, and current modulating means forming part of and actuable by said relay mechanism.

8. Electric relay mechanism actuable by current flow therethrough, comprising current consuming means including a winding, a movable member actuable in response to current flow through said current consuming means, and means actuated by said movement of said movable member for progressively and gradually varying the impedance of said current consuming means in response to progressive and gradual changes in said current flow.

9. Electrical relay mechanism comprising a thermally responsive member a portion at least whereof is movable in accordance with changes in temperature thereof, current consuming means comprising an electrically conductive heating element arranged in heat exchange relation to said member, and control means actuated by movement of said portion for progressively and gradually varying the impedance of said current consuming means in response to progressive and gradual changes in current flow therethrough.

10. The structure of claim 9 wherein said current consuming means also includes an additional conductive element, and wherein said control means is effective to control a paralleling connection between said elements.

11. The structure of claim 9 wherein said current consuming means also includes an additional conductive element also arranged in heat exchange relation to said member, and wherein said control means is effective to control a paralleling connection between said elements.

12. Electrical relay mechanism comprising a thermally responsive member a portion at least whereof is movable in accordance with changes in temperature thereof, first and second windings carried by said body in heat exchange relation thereto, and contact means actuated by movement of said portion for completing and interrupting a paralleling connection between said windings, said windings and said portion being so related that under predetermined operating conditions of said mechanism, each said completion changes the heating effect of said windings to such an extent as to produce a said interruption and vice versa.

13. Electrical relay mechanism comprising a thermally responsive member a portion at least whereof is movable in accordance with changes in temperature thereof, current consuming means comprising an electrically conductive heating element arranged in heat exchange relation to said member, control means actuated by movement of said portion for controlling the impedance of said current consuming means as a function of current flow therethrough, and additional control means actuable by said member for controlling an associated circuit.

14. Electrical relay mechanism comprising a thermally responsive member a portion at least whereof is movable in accordance with changes in temperature thereof, first and second windings carried by said body, contact means actuated by movement of said portion for controlling a paralleling connection between said windings, and additional contact means actuated by movement of said portion for controlling an associated circuit.

15. In an electrical circuit controlling device, a conducting element, a support for said element comprising integrally related portions normally disposed to movably receive said element, and a locking member disposed to distort one said portion relative to the other and thereby wedge said element between said portions.

16. In an electrical circuit controlling device, a conducting element, a support for said element formed to define a pair of slots, said element being received in one of said slots, and a locking member received in the other slot and operative to spread said other slot and wedge said element between the walls of the first slot.

17. The structure of claim 16 wherein said locking member is movable in said other slot between locked and unlocked positions and said locking member and said other slot having coengaging surfaces which produce a greater spreading of said other slot when said locking member is between its said positions than is produced when the locking member is in its locked position whereby to give said device an over-center action.

18. In a gauging system, a current-responsive gauging element variously responsive to a variable current therethrough, a current-responsive signal element operable to produce an action in the event the rate at which electrical energy is supplied thereto reaches a predetermined value, said signal element including a pair of impedance elements, and further including means responsive to the magnitude of current flow through said signal element to control the current through one of said impedance elements, and means responsive to a physical condition to be gauged for concurrently varying the current through said elements.

19. The combination of claim 18 in which said impedance elements are connected in parallel circuit as a consequence of an increase in current flow through said signal element.

20. The combination of claim 18 in which the other of said impedance elements is continually connected to pass current and said one impedance element is connected in parallel with said other impedance element as a consequence of an increase in current flow through said signal element.

21. In a gauging system, a current-responsive gauging element variously responsive to a variable current therethrough, a current-responsive signal element operable to produce an action in the event the rate at which electric energy is supplied thereto reaches a predetermined minimum value, said signal element including a heat responsive switch and a circuit including said switch, said signal element being operable as a consequence of a predetermined current through said signal element to actuate said switch to regulate the impedance of said signal element as an inverse function of the current flow therethrough, and means coupled to said elements and responsive to a physical condition to be gauged for concurrently varying the flow of current through said elements.

22. The combination of claim 21 in which said signal element includes a first impedance element and said circuit is arranged in parallel with said first impedance.

23. In a gauging system, a current-responsive gauging element variously responsive to a variable current therethrough, a current-responsive signal element operable to produce an action in the event the rate of which electric energy is supplied thereto reaches a predetermined minimum value, said signal element including a bimetallic member heated as a function of the current supplied to said signal element and including a contact movable by said bimetallic member and further including a circuit controlled by said contact, said contact being moved by said bimetallic member to reduce the impedance of said signal element as a consequence of an increased current flow therethrough, and means coupled to said elements and responsive to a physical condition to be gauged for concurrently varying the flow of current through said elements.

24. The combination of claim 23 in which said bimetallic member is heated by a first heater element, said second circuit includes a second heater element, and said contact controls the energization of said second heater.

25. In a gauging system, an electrical circuit comprising a current-responsive gauging element variously responsive to a variable current therethrough and including an impedance means, a current-responsive signal element having an impedance means, a variable impedance means, circuit means connecting said impedance means in series circuit, control means responsive to a physical condition to be gauged for regulating the magnitude of said variable impedance means, said signal element including a bimetallic member arranged to be heated by said signal element impedance means, a heater element arranged in heat exchange relation with said bimetallic member, circuit controlling means actuated by said bimetallic member and arranged to connect said heater element in parallel circuit with said signal element impedance means as a consequence of an increase in temperature of said bimetallic member, an alarm circuit controlled by said circuit controlling means and rendered effective as a consequence of a decrease in temperature of said bimetallic member.

26. In a gauging system, an electrical energy consuming element, a current-responsive signal element operable to produce an action in the event the rate at which electrical energy is supplied thereto reaches a predetermined value and including an energy consuming part, said signal element embodying impedance adjusting means associated with said part to vary the impedance of said signal element inversely to the current in said part, and means for regulating the current through said elements as a function of a physical condition to be gauged.

27. In a gauging system, an electrical energy consuming element, a current-responsive signal element operable to produce an action in the event the rate at which electrical energy is supplied thereto reaches a predetermined value and including a temperature responsive element heated as a consequence of current flow through said signal element, said signal element further including electrical impedance, means for regulating the magnitude of said impedance and actuated in inverse relation to the temperature of said temperature responsive element to reduce said impedance as a consequence of increasing temperature, and means for regulating the current through said elements as a function of a physical condition to be gauged.

28. In a gauging system, a current-responsive gauging element variously responsive to a variable current therethrough, and including a resistance element, a current-responsive signal element operable to produce an action in the event the rate at which electrical energy is supplied thereto reaches a predetermined value, said signal element including a resistance element, an electrical circuit connecting said resistance elements in series, said signal element further including means responsive to the magnitude of current flow therethrough for reducing the resistance afforded by said signal element resistance element as a consequence of an increasing current flow through said circuit, and means responsive to a physical condition to be gauged for varying the current through said circuit.

29. The combination of claim 28 in which said resistance element of said signal element comprises two resistance units one of which is continually connected to pass current under control of the physical condition current varying means and the other of which is selectively connected in parallel with said one impedance element as an inverse function of the current flow through said signal element.

30. Electrical relay mechanism actuable by current flow therethrough, comprising current consuming means for actuating said mechanism, and control means associated with said current consuming means and actuable thereby for selectively increasing and decreasing the impedance of said current consuming means, said current consuming means and said control means being so related that under predetermined operating conditions of said relay mechanism each said increase in impedance changes the effect of said current consuming means upon said control means to such an extent as to produce a said decrease and vice versa.

References Cited in the file of this patent

UNITED STATES PATENTS

| | | |
|---|---|---|
| 2,275,237 | Smulski | Mar. 3, 1942 |
| 2,487,204 | Woolnough | Nov. 8, 1949 |
| 2,508,350 | Belgeri | May 23, 1950 |
| 2,558,736 | Crews | July 3, 1951 |
| 2,598,081 | Sway | May 27, 1952 |
| 2,605,339 | Connolly | July 29, 1952 |
| 2,615,085 | Smulski | Oct. 21, 1952 |

FOREIGN PATENTS

| | | |
|---|---|---|
| 480,391 | Great Britain | Feb. 22, 1938 |
| 697,720 | Germany | Oct. 22, 1940 |